(12) United States Patent
Gomi et al.

(10) Patent No.: US 10,539,986 B2
(45) Date of Patent: Jan. 21, 2020

(54) SEMICONDUCTOR DEVICE, OPERATING CONDITION CONTROLLING METHOD, AND NON-TRANSITORY COMPUTER READABLE MEDIUM

(71) Applicant: Renesas Electronics Corporation, Tokyo (JP)

(72) Inventors: Takahiko Gomi, Tokyo (JP); Ryu Nagasawa, Tokyo (JP); Gaku Inami, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 120 days.

(21) Appl. No.: 15/826,855

(22) Filed: Nov. 30, 2017

(65) Prior Publication Data

US 2018/0181170 A1 Jun. 28, 2018

(30) Foreign Application Priority Data

Dec. 28, 2016 (JP) .................................. 2016-255194

(51) Int. Cl.
*G06F 1/32* (2019.01)
*G06F 1/20* (2006.01)
(Continued)

(52) U.S. Cl.
CPC .............. *G06F 1/206* (2013.01); *G06F 1/324* (2013.01); *G06F 1/3243* (2013.01);
(Continued)

(58) Field of Classification Search
CPC .. Y02D 10/171; Y02D 10/152; Y02D 10/126; G02D 10/16; G06F 1/206;
(Continued)

(56) References Cited

U.S. PATENT DOCUMENTS

| 8,468,373 B2* | 6/2013 | Machnicki | ............ | G06F 1/3203 |
| | | | | 713/300 |
| 2002/0073348 A1* | 6/2002 | Tani | ...................... | G06F 1/3203 |
| | | | | 713/300 |

(Continued)

FOREIGN PATENT DOCUMENTS

JP 2015-35073 A 2/2015

OTHER PUBLICATIONS

Communication dated May 28, 2018. from the European Patent Office in counterpart European application No. 17209020.1.

*Primary Examiner* — Volvick Derose
(74) *Attorney, Agent, or Firm* — McDermott Will & Emery LLP

(57) ABSTRACT

An operating condition is controlled from viewpoints both processing capacity and power consumption. A CPU 11 includes, for example, a plurality of CPU cores 11a to 11d, and configured to such that an operating condition can be varied. A performance table 26 is a table representing a relationship between the operating condition of the CPU 11 and the processing capacity of the CPU 11. A power consumption table 27 is a table representing a relationship between the operating condition of the CPU 11 and power consumption. An operation control unit 22 controls the operating condition of the CPU 11 referring to the performance table 26 and the power consumption table 27.

19 Claims, 9 Drawing Sheets

(51) Int. Cl.
*G06F 1/324* (2019.01)
*G06F 1/3234* (2019.01)
*G06F 1/3293* (2019.01)
*G06F 1/3287* (2019.01)
*G06F 1/3203* (2019.01)
*G06F 1/3209* (2019.01)

(52) U.S. Cl.
CPC .......... *G06F 1/3275* (2013.01); *G06F 1/3287* (2013.01); *G06F 1/3293* (2013.01); *G06F 1/3203* (2013.01); *G06F 1/3209* (2013.01)

(58) Field of Classification Search
CPC ...... G06F 1/3206; G06F 1/324; G06F 1/3243; G06F 1/3275; G06F 1/3287; G06F 1/329
USPC .......................................................... 713/322
See application file for complete search history.

(56) References Cited

U.S. PATENT DOCUMENTS

| | | | | |
|---|---|---|---|---|
| 2003/0229814 A1* | 12/2003 | Garnett | ................ | G06F 9/4411 713/322 |
| 2006/0149975 A1* | 7/2006 | Rotem | .................... | G06F 1/206 713/300 |
| 2007/0143763 A1* | 6/2007 | Adachi | .................... | G06F 1/206 718/104 |
| 2008/0036613 A1* | 2/2008 | Gaskins | ................ | G06F 1/206 340/584 |
| 2010/0095137 A1* | 4/2010 | Bieswanger | .......... | G06F 1/3203 713/300 |
| 2010/0115343 A1 | 5/2010 | Floyd et al. | | |
| 2010/0268968 A1* | 10/2010 | Ghiasi | .................... | G06F 1/3203 713/300 |
| 2011/0080202 A1* | 4/2011 | Moore | .................. | G06F 1/3203 327/276 |
| 2012/0072919 A1* | 3/2012 | Salsbery | ................ | G06F 1/3203 718/105 |
| 2012/0159198 A1* | 6/2012 | Naffziger | ................ | G06F 1/324 713/300 |
| 2014/0089700 A1* | 3/2014 | Chang | .................. | G06F 9/5094 713/322 |
| 2014/0215243 A1* | 7/2014 | Sado | ........................ | G06F 1/324 713/322 |
| 2014/0380071 A1* | 12/2014 | Lee | ........................ | G06F 1/3296 713/321 |
| 2015/0046685 A1 | 2/2015 | Park et al. | | |
| 2015/0046729 A1* | 2/2015 | Fukuoka | ................. | G06F 13/24 713/320 |
| 2016/0282930 A1* | 9/2016 | Ramachandran | ..... | G06F 1/3296 |
| 2017/0212792 A1* | 7/2017 | Huang | .................. | G06F 1/3228 |

* cited by examiner

SEMICONDUCTOR DEVICE, OPERATING CONDITION CONTROLLING METHOD, AND NON-TRANSITORY COMPUTER READABLE MEDIUM

CROSS-REFERENCE TO RELATED APPLICATIONS

This application is based upon and claims the benefit of priority from Japanese patent application No. 2016-255194, filed on Dec. 28, 2016, the disclosure of which is incorporated herein in its entirety by reference.

BACKGROUND

The present disclosure relates to a semiconductor device, an operating condition controlling method, and a non-transitory computer readable medium, and for example, a semiconductor device comprising a process executing unit configured such that operating conditions can be varied, and an operation control method and a non-transitory computer readable medium for such a semiconductor device.

Japanese Unexamined Patent Publication No. 2015-35073 discloses a semiconductor device capable of preventing a temperature rise while suppressing interruption of processing. A semiconductor device disclosed in Japanese Unexamined Patent Publication No. 2015-35073 comprises two CPU (Central Processing Unit) cores. Heating values of the two CPU cores are different from each other, and the heating value of one of the CPU cores is higher than that of the other of the CPU cores. In the semiconductor device disclosed in Japanese Unexamined Patent Publication No. 2015-35073, when a temperature measured by a temperature sensor succeeds a threshold value, execution of a program in the one of the CPU cores is interrupted. Then, data required for resuming program execution is transferred to the other of the CPU cores from the one of the CPU cores, and program execution is resumed in the other of the CPU cores. After the program execution is resumed, power supply to the one of the CPU cores is cut off, whereby a temperature rise of the CPU is suppressed.

SUMMARY

In recent years, in a semiconductor integrated circuit device, a semiconductor process is rapidly accelerating to meet market needs such as high capacity, high performance, and low cost. On the other hand, power consumption tends to increase with an advance in the semi conductor process, and importance of temperature control is increasing. In Japanese Unexamined Patent. Publication No. 2015-35073, power supply to the one of the CPU cores, a heating value of which is greater than that of the other one of the CPU cores, is cut off when a temperature succeeds a threshold value, whereby a temperature rise can be prevented. However, when power supply to the one of the CPU cores is cut, only the other of the CPU cores operates, whereby there is a possibility of causing sudden performance deterioration. In Japanese Unexamined. Patent Publication No. 2015-35073, control is only carried out from a viewpoint of suppressing a temperature rise, and there is a problem that performance deterioration caused by cutting off power supply to the one of the CPU cores is not considered.

Other problems of the related art and new features of the present disclosure will become apparent from the following descriptions of the specification and attached drawings.

According to an example aspect, a semiconductor device comprises an operation control unit configured to control an operating condition of a process execution unit using a performance table representing a relationship between the operating condition and processing capacity of the process execution unit and a power consumption table representing a relationship between the operating condition and power consumption.

According to the above example aspects, it is possible to realize an operation of a certain processing capacity with low power consumption.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
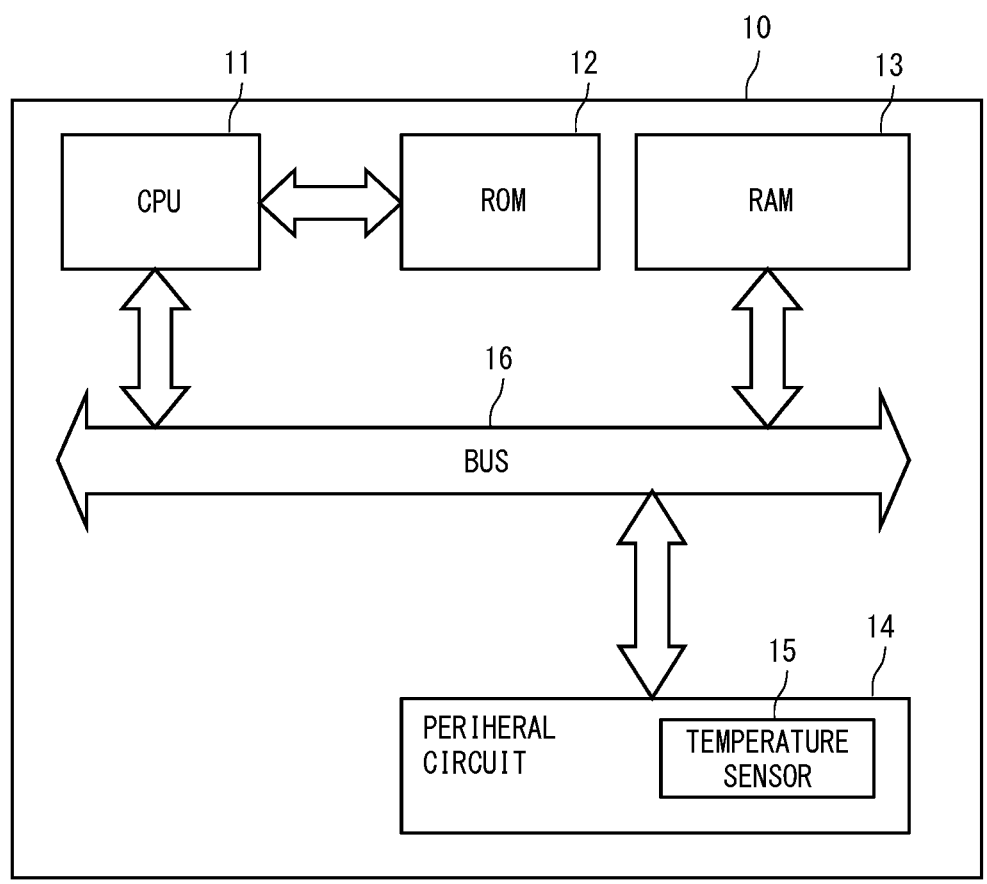
FIG. 1 is a block diagram showing a hardware configuration of a semiconductor according to a first embodiment.

Hereinafter, embodiments incorporating means for solving the above-described problem will be described in detail with reference to the drawings. For the clarification of the description, some of the following description and the drawings may be omitted or simplified as appropriate. Further, each element shown in the drawings as functional blocks that perform various processing can be formed of a CPU (Central Processing Unit), a memory, and other circuits in hardware and may be implemented by programs loaded in the memory in software. Those skilled in the art will therefore understand that these functional blocks may be implemented in various ways by only hardware, only software, or a combination thereof without any limitation. Throughout the drawings, the same components are denoted by the same reference symbols and overlapping descriptions will be omitted as appropriate.

The above program can be stored and provided to a computer using any type of non-transitory computer readable medium. Non-transitory computer readable medium include any type of tangible storage medium. Examples of non-transitory computer readable medium include magnetic storage medium (such as floppy disks, magnetic tapes, hard disk drives, etc.), optical magnetic storage medium (e.g. magneto-optical disks), CD-ROM (compact disc read only memory), CD-R (compact disc recordable), (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable medium. Examples of transitory computer readable medium include electric signals, optical signals, and electromagnetic waves. Transitory computer readable medium, can provide the program to a computer via a wired communication line (e.g. electric wires, and optical fibers) or a wireless communication line.

The present disclosure will be described by dividing it into a plurality of sections or embodiments whenever circumstances require it for convenience in the following embodiments. However, unless otherwise particularly specified, these sections or embodiments may not be irrelevant to one another. One section or embodiment may be related to modifications, applications, details, supplementary explanations, and the like of some or all of the other ones. When reference is made to the number of elements or the like (including the number of pieces, numerical values, quantity, range, etc.) in the following embodiments, the number thereof is not limited to a specific number and may be greater than or less than or equal to the specific number unless otherwise particularly specified and definitely limited to the specific number in principle.

Further, in the following embodiments, components (including operation steps, etc.) are not always essential unless otherwise particularly specified and considered to be definitely essential in principle. Similarly, when reference is made to the shapes, positional relations, or the like of the components or the like in the following embodiments, they will include ones, for example, substantially approximate or similar in their shapes or the like unless otherwise particularly specified and considered not to be definitely so in principle. This is similarly applied even to the above-described number or the like (including the number of pieces, numerical values, quantity, range, etc.).

First Embodiment

FIG. 1 shows a hardware configuration of a semiconductor device according to a first embodiment. A semiconductor (semiconductor integrated circuit) 10 comprises a CPU 11, a ROM 12, a RAM 13, a peripheral circuit 14, and a bus 16. The semiconductor device 10 is configured as, for example, a microcomputer unit (MCU). The semiconductor device 10 is, for example, installed in a portable wireless communication terminal such as a smart phone. Alternatively, the semiconductor device 10 may be installed in a potable game terminal, a tablet PC (personal computer), a note PC, or the like. Further, the semiconductor device 10 may be installed in a vehicle such as an automobile, and may be used for, for example, ADAS (Advanced Driver Assistance System) in the vehicle. The semiconductor device 10 may be configured as a system comprising a power management system, and equipment in which the semiconductor device 10 is installed is not particularly limited to the above mentioned equipment.

The CPU 11 constitutes a process execution unit in the semiconductor device 10, and executes various processes. The CPU 11 is configured such that an operating condition can be varied. The CPU 11 comprises, for example, a plurality of CPU cores (processors), and is configured such that the number of the CPU cores to operate therein can be varied. In addition, CPU 11 is configured such that an operating frequency of each CPU core can be varied. The CPU 11 operates with processing capacity and power consumption which vary depending on an operating condition including the number of the CPU cores to operate and the operating frequency of the CPU core.

The ROM 12 is a non-volatile memory such as, for example, a flash memory. The ROM 12 stores programs therein to be executed by the CPU 11. The CPU 11 executes various processes by executing programs read out from the ROM 12. Programs stored in the ROM include a program for controlling the operating condition of the CPU 11. The RAM 13 is a volatile memory for storing various data.

The peripheral circuit 14 includes various peripheral circuits built-in the semiconductor device 10. The peripheral circuit id includes, for example, a temperature sensor 15 for measuring a temperature. The temperature sensor 15 includes, for example, a resistive element, output voltage of which is varied depending on the temperature. Alternatively, the temperature sensor 15 includes an oscillator such as a ring oscillator, which oscillates at a temperature dependent cycle. Note that various types of temperature sensors can be used as the temperature sensor 15, and the type of the temperature sensor 15 is not limited to a particular type. In the semiconductor device 10, the RAM 13, the peripheral circuit 14 and the like are connected to the CPU 11 via the bus 16.

The semiconductor device 10 may comprise not shown input output ports for inputting and outputting signals between an external peripheral circuit and other externally placed devices. Note that, in the above explanation, although an example in which the temperature sensor 15 is included in the peripheral circuit 14 within the semiconductor device 10 is given, the temperature sensor 15 is not limited to being built-in the semiconductor device 10. The temperature sensor 15 may be disposed in an external peripheral circuit, and output signals of the temperature sensor 15 may be input to the semiconductor device 10 through an input/output port.

Figure 2:
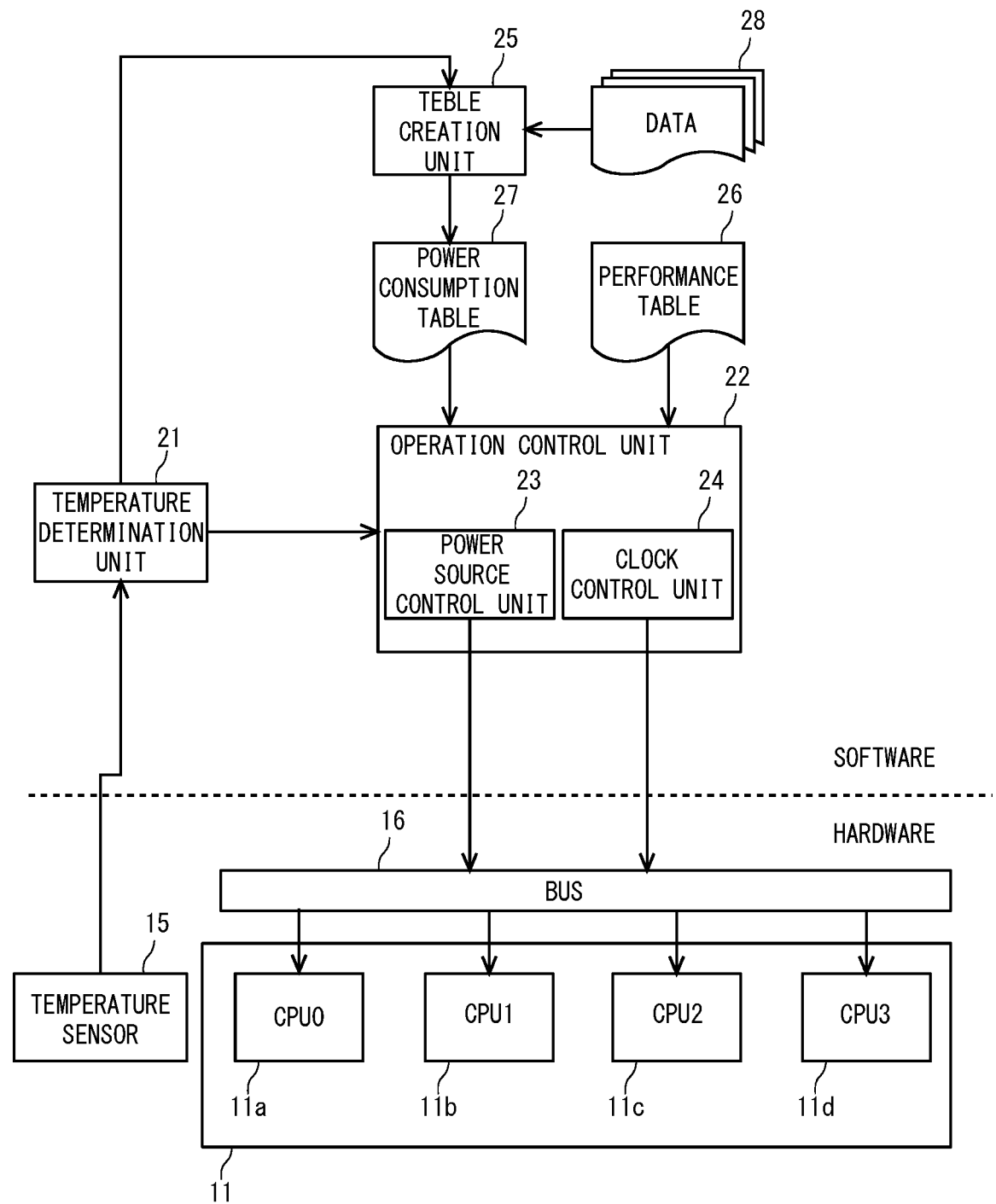
FIG. 2 is a block diagram showing functions of portions relating to control of an operating condition in a semiconductor device.

FIG. 2 shows functional blocks relating to portions for controlling the operating condition in the semiconductor device 10. The semiconductor device 10 comprises functions of a temperature determination unit 21, an operation control unit 22, and a table creation unit 25. Hereinafter, an example in which the CPU 11 comprises four CPU cores 11a to 11d is mainly explained. In the semiconductor device 10, each function of the temperature determination unit 21, the operation control unit 22, and the table creation unit 25 is implemented, for example, by the CPU 11 operating according to programs read out from the RPM 12 (refer to FIG. 1).

The temperature determination unit 21 is connected to the temperature sensor 15, and monitors temperatures measured by using the temperature sensor 15. A performance table 26 is a table representing a relationship between the operating condition of the CPU 11 and the processing capacity of the CPU 11. A power consumption table 27 is a table representing a relationship between the operating condition and the power consumption of the CPU 11. The power consumption may vary depending on the temperature, even if the operating conditions are the same. The table creation unit 25 calculates, based on the temperature measured by using the temperature sensor 15 and data 28, power consumption for each of the operating conditions of the CPU 11 under an environment of the temperature measured. The table creation unit 25 associates the power consumption calculated to each operating condition, and stores the power consumption calculated in the power consumption table 27. The data 28 includes parameters required for calculating the power consumption of the semiconductor device 10. The table creation unit 25 creates the power consumption table 27, for example, when the temperature determination unit 21 determines that a temperature change is large.

The operation control unit 22 controls the operating condition of the CPU 11 referring to the performance table 26 and the power consumption table 27. The operation control unit 22, in the controlling of the operating condition, determines the number of the CPU cores to operate in the CPU 11 and the operating frequency of the CPU core referring to the performance table 26 and power consumption table 27.

In the present embodiment, the operation control unit 22 comprises a power source control unit 23 and a clock control unit 24. The power source control unit 23 supplies electricity to the CPU cores to operate among the four CPU cores 11a to 11d included in the CPU 11, and cuts off power supply to the CPU cores which are not operated. The clock control unit 24 controls the operating frequency of the CPU cores 11a to 11d by controlling a frequency of clock signals to be supplied to the CPU cores 11a to 11d. The clock control unit 24 supplies the clock signals of a determined operating frequency to the CPU cores to operate among file four CPU cores 11a to 11d. The operating condition of the CPU 11 is controlled by controlling the number of the CPU cores to which the power source control unit 23 supplies electricity and the frequency of the clock signals which the clock control unit 24 supplies to the CPU cores.

The temperature determination unit 21 determines whether or not to carry out control (temperature control) of the operating condition of the CPU 11, based on a temperature measured by using the temperature sensor 15. The temperature determination unit 21 determines not to carry out the temperature control, for example, when a temperature measured by using the temperature sensor 15 falls within a predetermined temperature range. The temperature determination unit 21 determines to carry out the temperature control when the temperature measured is equal to or more than an upper limit (upper limit temperature threshold value) of the predetermined temperature range. In addition, the temperature determination unit 21 determines to carry out the temperature control when the temperature measured is equal to or less than a lower limit (lower limit temperature threshold value) of the predetermined temperature range.

The operation control unit 22 carries out control of the operating condition of the CPU 11 when it is determined to carry out the temperature control in the temperature determination unit 21. The operation control unit 22 controls the operating condition of the CPU 11 to lower power consumption by making the processing capacity of the CPU 11 lower than what it was before controlling was carried out, when the temperature measured is equal to or higher than the upper limit temperature threshold value. By lowering power consumption, an increase in temperature is suppressed. Further, the operation control unit 22 controls the operating condition of the CPU 11 to increase power consumption by making the processing capacity greater than what it was before controlling was carried out, when the temperature measured is equal to or less than the lower limit temperature threshold value.

[Relationship Between Power Consumption and Processing Capacity]

A relationship between power consumption and processing capacity of the semiconductor device 10 will now be described. In general, the greater the number of the CPU cores to operate in the CPU 11, or the higher the operating frequency, the higher the processing capacity that can be obtained. On the contrary, if the number of the CPU cores to operate in the semiconductor device 10 is constant, the power consumption increases as the operating frequency increases. In addition, if the operating frequency is constant in the semiconductor device 10, the power consumption increases as the number of the CPU cores to operate increases.

The power consumption of the semiconductor device 10 is roughly divided into two type of power: dynamic power and leak power. The dynamic power is consumed power required for carrying out a certain process. On the other hand, the leak power is consumed power caused by turning on the power. The leak power becomes the maximum in the semiconductor device 10 when electricity is supplied to the four CPU cores lie to lid included in the CPU 11. It is possible to reduce the leak power by cutting off power supply to unused CPU cores among the CPU cores 11a to 11d.

Figure 3:
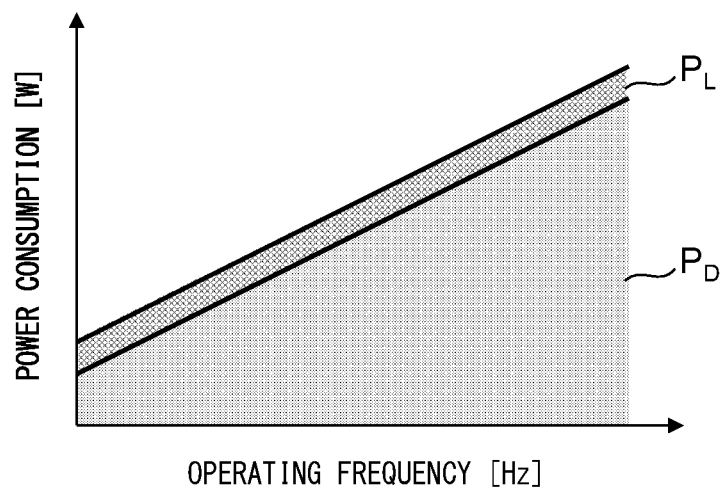
FIG. 3 is a graph showing operating frequency dependence of power consumption of a semiconductor device.

FIG. 3 shows frequency dependence of power consumption of the semiconductor device 10. In a graph shown in FIG. 3, the abscissa represents power consumption, and the ordinate represents the operating frequency of the CPU 11. In FIG. 3, the power consumption is represented by the sum of dynamic power $P_D$ and the leak power $P_L$. As shown in FIG. 3, the dynamic power $P_D$ depends on the operating frequency (processing amount), and increases as the operating frequency increases. On the other hand, the leak power $P_L$ does not depend on the operating frequency and constants if the temperature does not change.

Figure 4:
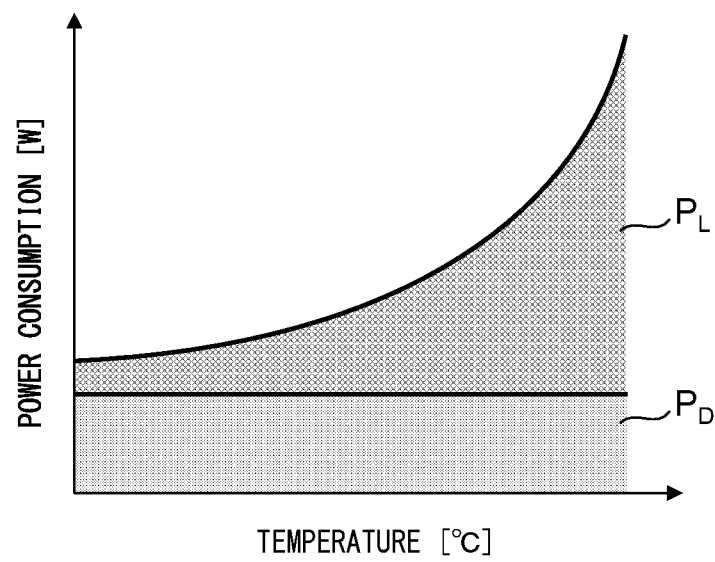
FIG. 4 is a graph showing temperature dependence of power consumption of a semiconductor device.

FIG. 4 shows temperature dependence of power consumption of the semiconductor device 10. In a graph shown FIG. 4, the abscissa represents power consumption, and the ordinate represents the temperature of the semiconductor device 10. As shown in FIG. 4, the leak power $P_L$ depends on the temperature, and exponentially increases as the temperature increases. On the other hand, dynamic power $P_D$ does not depend on the temperature and constant if the processing amount is constant.

As mentioned above, the dynamic power depends on the operating frequency (processing amount), and does not depend on the temperature. In contrast, the leak power depends on the temperature, and does not depend on the operating frequency. The characteristics of the two types of power are shown in the below Table 1.

TABLE 1

|  | Operating frequency (Processing amount) | Temperature |
| --- | --- | --- |
| Dynamic power | has dependency | does not have dependency |
| Leak power | does not have dependency | has dependency |

Figure 5:
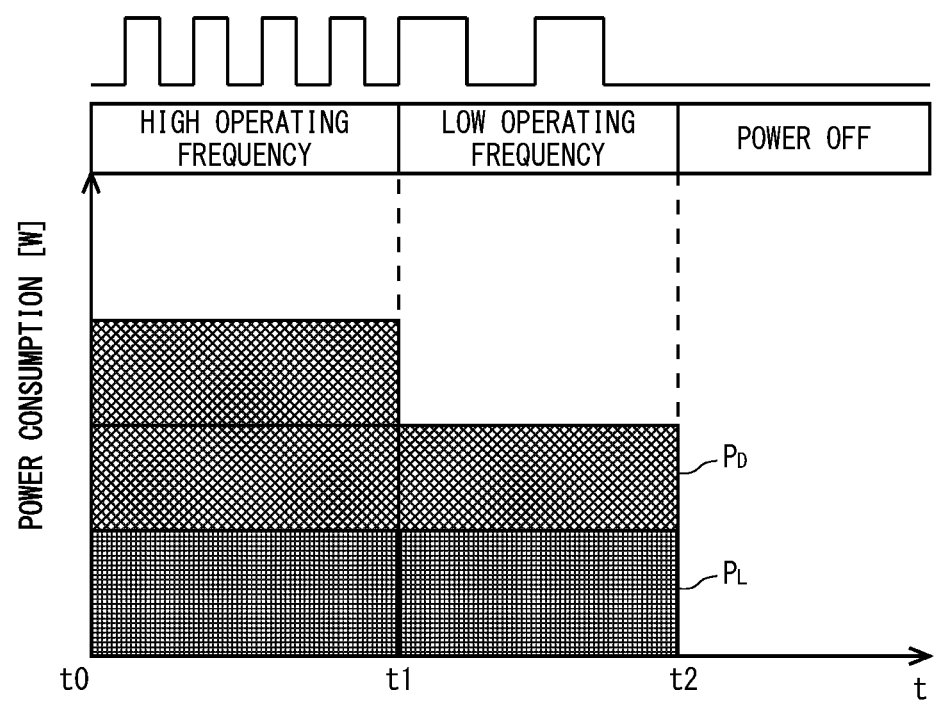
FIG. 5 is a diagram showing power consumption in a CPU core.

FIG. 5 shows power consumption in the CPU core. In a FIG. 5, the abscissa represents power consumption, and the ordinate represents time. The overall power consumption of the CPU 11 is the sum of the respective power consumptions of the CPU cores. At time t0, it is assumed that the CPU core operates at a high frequency. At time t1, when the operating frequency of the CPU core is switched to a low frequency, as the dynamic power $P_D$ decrease due to the lowered operating frequency, the power consumption of the CPU core is decreased that much. At this time, the leak power $P_L$ does not change if the temperature does not change. As the CPU core stops its operation and power supply to the CPU core is cut, off at time t2, the dynamic power $P_D$ and the leak power $P_D$ become zero.

In the temperature control of the semiconductor device 10, in general, when the temperature is high, by lowering the processing capacity and reducing the power consumption, the temperature is lowered. In the semiconductor device 10, if the operating frequency is lowered, the dynamic power is reduced, and thus it is possible to reduce the power consumption. Further, the leak power is reduced by decreasing the number of the CPU cores to operate in the CPU 11 and cutting off power supply to a non-operating CPU core, whereby it is possible to reduce the power consumption.

For example, when reducing the power consumption while maintaining a certain processing capacity, a case where the operating frequency of the CPU 11 is lowered without changing the number of CPU cores to operate so as to reduce the power consumption and a case where the number of CPU cores to operate is decreased without changing the operating frequency so as to reduce the power consumption can be considered. As aforementioned, as the leak power exponentially changes with respect to the temperature, under a certain temperature environment, there is a case where the overall power consumption can be reduced by reducing the number of CPU cores to operate and thereby reducing the leak power rather than lowering the operating frequency and thereby reducing the dynamic power. Further, under another temperature environment, there is a case where the overall power consumption can be reduced by lowering the operating frequency and thereby reducing the dynamic power rather than reducing the number of CPU cores to operate and thereby reducing the leak power.

In the present embodiment, the performance table 26 and the power consumption table 27 are used for controlling the operating condition of the CPU 11. The operation control unit 22 refers to the performance table 26 and extracts one or more operating conditions associated with processing capacity having a predetermined relationship with respect to reference processing capacity. When a plurality of operating conditions are extracted, the operation control unit 22 refers to the power consumption table 27 to identify an operating condition with the lowest power consumption among the plurality of operating conditions, and controls the operating condition of the CPU 11 to the operating condition identified. When one operating condition is extracted, the operation control unit 22 controls the operating condition of the CPU 11 to the operating condition extracted.

The operation control unit 22 regards, for example, the processing capacity of the CPU 11 before the operating condition is controlled as the reference processing capacity. The operation control unit 22 refers to the performance table 26 and extracts one or more operating conditions associated with processing capacity having a predetermined relationship with respect to the reference processing capacity. For example, when the temperature determination unit 21 determines that the temperature measured is equal to or higher than the upper limit temperature threshold value, the operation control unit 22 searches for the performance table 26 to extract one or more operating conditions associated with the highest processing capacity among processing capacities lower than reference processing capacity, namely one or more operating conditions associated with processing capacity one level lower than the reference processing capacity. For example, when the temperature determination unit 21 determines that the temperature measured is equal to or lower than the lower limit temperature threshold value, the operation control unit 22 searches for the performance table 26 to extract one or more operating conditions associated with the lowest processing capacity among processing capacities higher than reference processing capacity, namely one or more operating conditions associated with processing capacity one level higher than the reference processing capacity. The operation control unit 22 refers to the power consumption table 27, when a plurality of operating conditions are extracted, to identify an operating condition with the lowest power consumption among the plurality of operating conditions extracted, and controls the operating condition of the CPU 11 to the operating condition identified. By carrying out the control of this kind, when operating the CPU 11 with a certain processing capacity, it is possible to operate the CPU 11 by the operating condition with the lowest power consumption.

[Operation Procedure]

Figure 6:
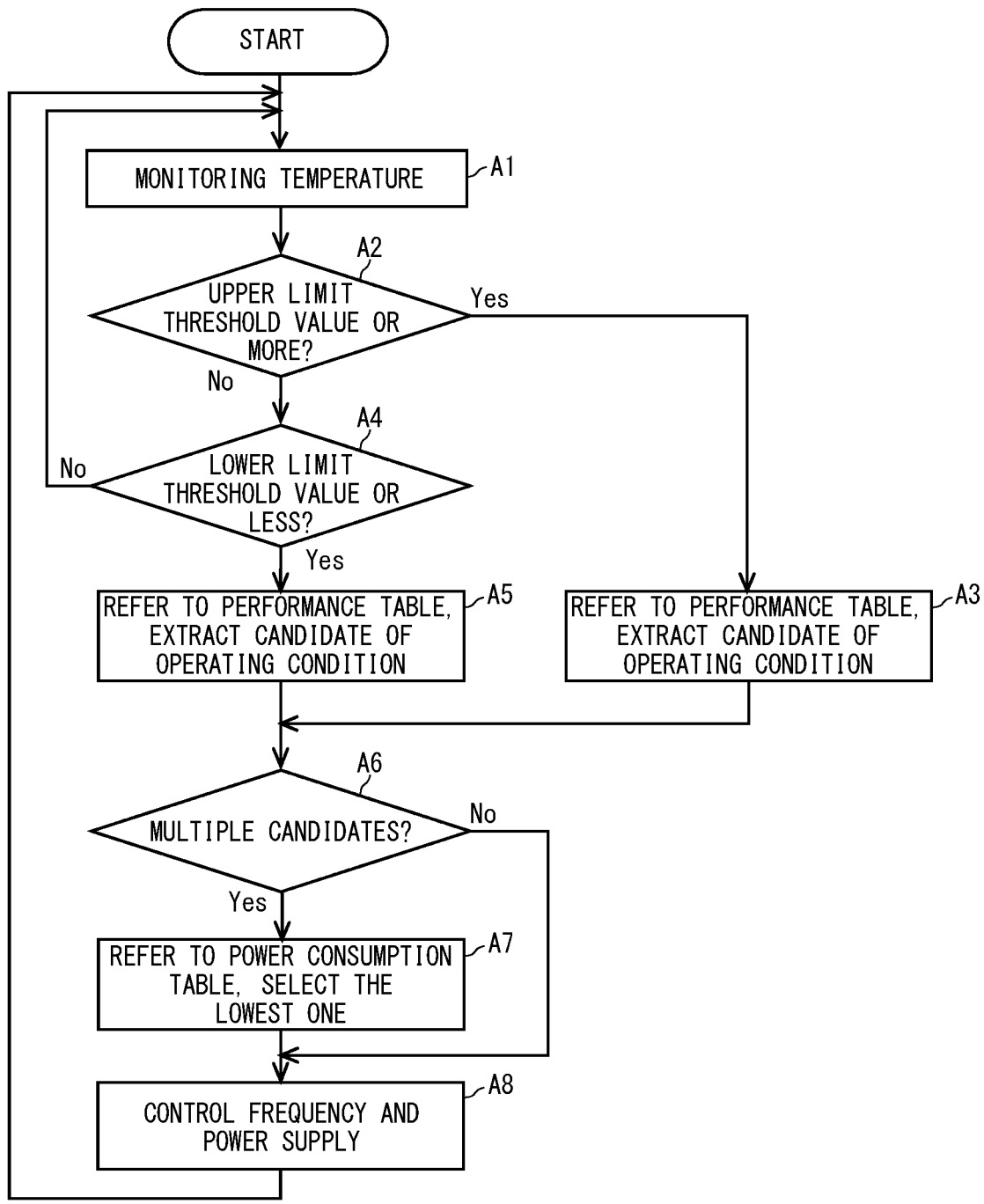
FIG. 6 is a flow chart showing an operation procedure of control of an operating condition.

FIG. 6 shows an operation procedure of control of the operating condition. The temperature determination unit 21 obtains a signal output from the temperature sensor 15, and monitors the temperature of the semiconductor device 10 (Step A1). The temperature determination unit 21 determines whether the temperature measured by using the temperature sensor 15 is equal to or higher than the upper limit temperature threshold value or not (Step A2). When the temperature determination unit 21 determines that the temperature is equal to or higher than the upper limit temperature threshold value, it notifies the operation control unit 22 of that. Upon receiving a notification indicating the temperature is equal to or higher than the upper limit temperature threshold value, the operation control unit 22 searches for the performance table 26 and extracts one or more operating conditions associated with processing capacity one level lower than the processing capacity associated with the current operating condition, as a candidate of the operating condition after the control of the operating condition (Step A3).

When the temperature determination unit 21 determines that the temperature measured at Step A2 is lower than the upper limit temperature threshold value, it determines whether the temperature measured is equal to or lower than the lower limit temperature threshold value or not (Step A4). When the temperature determination unit 21 determines that the temperature is higher than the lower limit temperature threshold value, it returns to Step A1 and continues the monitoring of the temperature. When the temperature determination unit 21 determines that the temperature is equal to or lower than the lower limit temperature threshold value, it notifies the operation control unit 22 of that. Upon receiving a notification indicating that the temperature is equal to or lower than the lower limit temperature threshold value, the operation control unit 22 searches for the performance table 26 and extracts one or more operating conditions associated with processing capacity one level higher than the processing capacity associated with the current operating condition, as a candidate of the operating condition after the control of the operating condition (Step A5).

The operation control unit 22 determines whether or not a plurality of operating conditions (candidates of the operating condition) are extracted at Step A3 or Step A5 (Step A6). When the operation control unit 22 determines that a plurality of operating conditions are extracted, it refers to the power consumption table 27 and obtains power consumption associated with each of the plurality of the operating conditions extracted. The operation control unit 22 compares the respective obtained power consumptions associated with the plurality of the operating conditions with each other, and selects an operating condition with the lowest power consumption (Step A7).

The operation control unit 22 controls the operating condition of the CPU 11 so as to operate the CPU 11 by a combination of the number of the CPU cores and the operating frequency indicated by the operating condition extracted at Steps A3 or A5, or selected at Step A7 (Step A8). In Step A8, the power source control unit 23 supplies electricity to the number of CPU cores indicated by the operating condition which, for example, is selected at Step A7 among the CPU cores 11a to 11d. The power source control unit 23 cuts off power supply to the CPU cores which are not operated. Further, the clock control unit 21 supplies a clock signal of the operating frequency indicated by the operating condition which, for example, is selected at Step A7. Thereafter, the process returns to Step A1, and monitoring of the temperature is continued.

Figure 7:
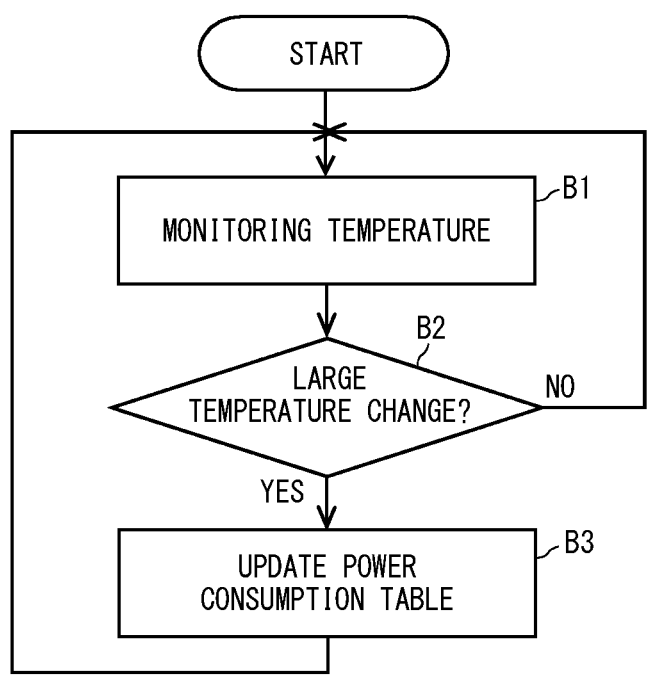
FIG. 7 is a flow chart showing an operation procedure of creation of a power consumption table.

FIG. 7 shows an operation procedure of creation of the power consumption table. Creation of the power consumption table 27 is carried out, for example, in parallel with the control of the operating condition shown in FIG. 6. The temperature determination unit 21 obtains a signal output from the temperature sensor 15, and monitors the temperature of the semiconductor device 10 (Step B1). The temperature determination unit 21 determines whether or not temperature change with respect to the last measured temperature is equal to or greater than a threshold value (Step B2). In Step B2, the temperature determination unit 21 determines that the temperature change is equal to or greater than the threshold value, for example, when a difference between the last measured temperature and the current measured temperature is equal to or greater than a predetermined temperature difference, for example, equal to or greater than 5 degrees Celsius. When the temperature determination unit 21 determines that the temperature change is less than the threshold value, it returns to Step B1 and continues the monitoring of the temperature.

When the temperature determination unit 21 determines that the temperature change is equal to or greater than the threshold value at Step B2, it notifies the table creation unit 25 of that. Upon receiving a notification indicating that the temperature change is equal to or greater than the threshold value, the table creation unit 25 creates (updates) the power consumption table 27 using the data 28 (Step B3). In Step B3, the table creation unit 25 calculates the leak power under the current temperature environment for each operating condition, and calculates the sum of the leak power calculated and the dynamic power calculated separately, as power consumption for each operating condition. Thereafter, the process returns to Step B1, and monitoring of the temperature is continued. In this way, by updating the power consumption table when the temperature change is detected, it is possible to deal with a case where the temperature is changed and thereby the operating condition with the lowest power consumption among the operating conditions realizing the same processing capacity is changed.

Numerical Example

Hereinafter, specific numerical examples are explained. As the CPU 11 of a control target, the four CPU cores 11a to 11d shown in FIG. 2 are considered. It is assumed that each CPU core is capable of being operated at a frequency selected from 500 MHz, 1000 MHz, 1500 MHz, and 2000 MHz. It is assumed that a performance specification of each CPU core is 6 DMIPS (Dhrystone MIPS (million instructions per second)/MHz. It is assumed that the dynamic element power is 0.4 mW/MHz, and the leak power is 150 mW when the junction temperature Tj of the semiconductor device is 90 degrees Celsius. Further, it is assumed that an SoC (Silicon On Chip) heat resistant standard is Tj<=125 degrees Celsius. The upper limit temperature threshold value is set to a temperature somewhat lower than the SoC heat resistant standard, for example, 90 degrees Celsius.

Operational performance [DMIPS] of each CPU core is represented by the product of the CPU performance specification [DMIPS/MHz] and the operating frequency [MHz]. Overall processing capacity of the CPU 11 is represented by the product of the operational performance of each CPU core and the number of the CPU cores to operate. Power consumption [mW] of each CPU core is represented by the sum of the dynamic power [mW] and the leak power [mW]. Overall power consumption of the CPU 11 is represented by the sum of the power consumption of each CPU core.

The dynamic power is represented by the product of the dynamic element power [mW/MHz] and the maximum operating frequency [MHz]. The leak power is represented by the product of a leak current and a voltage. The leak current is given by the following equation, where $i_L$ is the leak current per transistor, N is the total number of transistors, and r is the shutdown rate.

$$I_I = i_L * N * (1-r)$$

The leak current per transistor $i_L$ can be represented by the following equation, using a coefficient α [A/nm], a gate width W [nm], a threshold voltage $V_T$ [V], a sub threshold coefficient n, the Boltzmann constant k=1.38*10$^{-23}$ [J/K], an absolute temperature T [K], and the elementary electrical charge q=1.6*10$^{-19}$ [C]. Here, the coefficient α, the sub threshold coefficient n, and the like can be obtained from experiments.

$$i_I = \alpha * W * \exp\{-V_T * q / (n * kT)\}$$

It should be noted that, in the data 28 shown in FIG. 2, parameters required for calculating the above mentioned dynamic power and the leak power are included. The data 28 are stored, for example, in the ROM 12 (refer to FIG. 1). The table creation unit 25 calculates, in particular, the leak power which varies depending on the temperature using parameters included in the data 28. With respect to the dynamic power, as the dynamic power does not vary depending on the temperature, pre-calculated power may be stored as a portion of the data 28. The power consumption table 27 created by the table creation unit 25 is stored, for example, in the RAM 13. The performance table 26 is stored, for example, in the ROM 12 or the RAM 13.

An example of the performance table is shown as the following Table 2.

TABLE 2

PERFORMANCE TABLE

| Operating frequency | Number of CPUs | | | |
|---|---|---|---|---|
| | 1 | 2 | 3 | 4 |
| 500 MHz | 3000 DMIPS | 6000 DMIPS | 9000 DMIPS | 12000 DMIPS |
| 1000 MHz | 6000 DMPIS | 12000 DMPIS | 18000 DMPIS | 24000 DMPIS |
| 1500 MHz | 9000 DMIPS | 18000 DMIPS | 27000 DMIPS | 36000 DMIPS |
| 2000 MHz | 12000 DMIPS | 24000 DMIPS | 36000 DMIPS | 48000 DMIPS |

An example of a power consumption table under a certain temperature environment is shown as the following Table 3.

TABLE 3

POWER CONSUMPTION TABLE

| Operating frequency | Number of CPUs | | | |
|---|---|---|---|---|
| | 1 | 2 | 3 | 4 |
| 500 MHz | 380 mW | 760 mW | 1140 mW | 1520 mW |
| 1000 MHz | 610 mW | 1220 mW | 1830 mW | 2440 mW |
| 1500 MHz | 840 mW | 1680 mW | 2520 mW | 3360 mW |
| 2000 MHz | 1070 mW | 2140 mW | 3210 mW | 4280 mW |

For example, at a certain time, it is assumed that all of the four CPU cores 11a to 11d of the CPU 11 operate at an operating frequency 2000 MHz. In this case, when it is determined at Step A2 of FIG. 6 that the temperature is equal to or higher than the upper limit temperature threshold value, the operation control unit 22 refers to the performance table shown as the Table 2 and searches for processing capacity one level lower than the current processing capacity. Referring to the Table 2, when the number of operating CPU cores is four and the operating frequency is 2000 MHz, the processing capacity is 48000 DMIPS. The operation control unit 22 searches for processing capacity one level lower than the processing capacity 48000 DMIPS. Referring to the Table 2, the one level lower processing capacity is 36000 DMIPS.

The operation control unit 22 extracts one or more operating conditions associated with the above searched one level lower processing capacity 36000 DRIPS from the performance table 26. Referring to the Table 2, there are two operating conditions associated with the processing capacity 36000 DMIPS: the operating condition composed of a combination of the number of operating CPU cores 4 and the operating frequency 1500 MHz, and the operating condition composed of a combination of the number of operating CPU cores 3 and the operating frequency 2000 MHz. The operation control unit 22 extracts, at Step A3, these operating conditions as candidates of the operating condition after the control of the operating condition.

In the above described case, the operation control unit 22 determines, at Step A6, that a plurality of candidates of the operating condition are extracted. In this case, at Step A7, the operation control unit 22 refers to the power consumption table 27 and obtains power consumption associated with each of the plurality of the operating conditions extracted. Referring to the Table 3, the power consumption associated with the operating condition composed of the combination of the number of operating CPU cores 4 and the operating frequency 1500 MHz is 3360 mW, and the power consumption associated with the operating condition composed of the combination of the number of operating CPU cores 3 and the operating frequency 2000 MHz is 3210 mW. Comparing the two operating conditions, although their processing capacities are the same, the power consumption of the operating condition composed of the combination of the number of operating CPU cores 3 and the operating frequency 2000 MHz, is lower than that of the operating condition composed of the combination of the number of operating CPU cores 4 and the operating frequency 1500 MHz. In this case, the operation control unit 22 selects, at Step A7, the operating condition composed of the combination of the number of operating CPU cores 3 and the operating frequency 2000 MHz out of the two operating conditions extracted.

The operation control unit 22 controls the operating condition of the CPU 11 so as to operate three CPU cores in the CPU 11 at the operating frequency 2000 MHz, at Step A8. The power source control unit 23 causes three CPU cores in the CPU 11 to operate by supplying electricity, for example, to the three CPU cores 11a to 11c and cutting off power supply to the remaining CPU core 11d. Further, the clock control unit 24 supplies clock signals of frequency 2000 MHz to the CPU cores 11a to 11c to operate, thereby causing these CPU cores to operate at the operating frequency 2000 MHz.

In the above described case, heating can be suppressed by simply lowering the operating frequency of each CPU core to 1500 MHz without changing the number of the CPU cores to operate. However, in this case, although the processing capacities are equivalent, power is wastefully consumed compared to the case where the operating condition is controlled to the one composed of the combination of the number of operating CPU cores 3 and the operating frequency 2000 MHz. In the present embodiment, the operating condition is selected from the viewpoint of both performance and power consumption, using the performance table 26 and the power consumption table 27. In this way, it is possible to realize a certain processing capacity with the lowest power consumption. By using the semiconductor device 10 according to the present embodiment, it is possible to prolong a battery life time, for example, in a device which is operated by a battery. Further, it is possible to suppress heat generation as much as a certain processing capacity can be realized by lower power consumption.

At another time, it is assumed that, when the three CPU cores 11a to 11c operate at an operating frequency 2000 MHz in the CPU 11, it is determined that the temperature is equal to or higher than the upper limit temperature threshold value at Step A2 of FIG. 6. In this case, the operation control unit 22 refers to the performance table shown as Table 2 and searches for processing capacity one level lower than the current processing capacity 36000 DMIPS. The operation control unit 22 searches for processing capacity 27000 DMIPS as the processing capacity one level lower than the current processing capacity 36000 DMIPS.

The operation control unit 22 extracts, at Step A3, one or more operating conditions associated with the above searched one level lower processing capacity 27000 DMIPS from the performance table 26. Referring to the Table 2, there is only one operating condition associated with the processing capacity 27000 DMIPS: the operating condition composed of a combination of the number of operating CPU cores 3 and the operating frequency 1500 MHz. The operation control unit 22 extracts, at Step A3, this operating condition as a candidate of the operating condition after the control of the operating condition.

In the above described case, the operation control unit 22 determines, at Step A6, that a plurality of candidates of the opera ting condition are not extracted, and proceeding to Step A8, controls the operating condition of the CPU 11 so as to operate three CPU cores in the CPU 11 at the operating frequency 1500 MHz. The power source control unit 23 supplies electricity, for example, to the three CPU cores 11a to 11c and cuts off power supply to the remaining CPU core 11d. Further, the clock control unit 24 supplies clock signals of frequency 1500 MHz to the CPU cores 11a to 11c to operate, thereby causing these CPU cores to operate at the operating frequency 1500 MHz.

At yet another time, it is assumed that, when the three CPU cores 11a to 11c operate at an operating frequency 1500 MHz in the CPU 11, it is determined that the temperature is equal to or lower than the lower limit temperature threshold value at Step A4 of FIG. 6. In this case, the operation control unit 22 refers to the performance table shown as Table 2 and searches for processing capacity one level higher than the current processing capacity 27000 DMIPS. The operation control unit 22 searches for processing capacity 36000 DMIPS as the processing capacity one level higher than the current processing capacity 27000 DMIPS.

The operation control unit 22 extracts, at Step A5, one or more operating conditions associated with the above searched one level higher processing capacity 36000 DMIPS from the performance table 26. Referring to the Table 2, there are two operating conditions associated with the processing capacity 36000 DMIPS: the operating condition composed of a combination of the number of operating CPU cores 3 and the operating frequency 2000 MHz, and the operating condition composed of a combination of the number of operating CPU cores 4 and the operating frequency 1500 MHz. The operation control unit 22 extracts, at Step A5, these operating conditions as candidates of the operating condition after the control of the operating condition.

The operation control unit 22 determines, at Step A6, that a plurality of candidates of the operating condition are extracted. At Step A7, the operation control unit 22 refers to the power consumption table 27 and obtains power consumption associated with each of the plurality of the operating conditions extracted. Referring to the Table 3, the power consumption associated with the operating condition composed of the combination of the number of operating CPU cores 4 and the operating frequency 1500 MHz is 3360 mW, and the power consumption associated with the operating condition composed of the combination of the number of operating CPU cores 3 and the operating frequency 2000 MHz is 3210 mW. In this case, the operation control unit 22 selects, at Step A7, the operating condition composed of the combination of the number of operating CPU cores 3 and the operating frequency 2000 MHz out of the two operating conditions extracted. If the power consumption table 27 has been updated, an operating condition with lower power consumption is selected referring to the power consumption table updated.

The operation control unit 22 controls the operating condition of the CPU 11 so as to operate three CPU cores in the CPU 11 at the operating frequency 2000 MHz, at Step A8. The power source control unit 23 causes three CPU cores in the CPU 11 to operate by supplying electricity, for example, to the three CPU cores 11a to 11c and cutting off power supply to the remaining CPU core 11d. Further, the clock control unit 24 supplies clock signals of a frequency 2000 MHz to the CPU cores 11a to 11c to operate, thereby causing these CPU cores to operate at the operating frequency 2000 MHz. If only one operating condition is extracted at Step A5, proceeding to Step A8 from Step A6, the operating condition of the CPU 11 is controlled to the one extracted at Step A5.

SUMMARY

In the present embodiment, the operation control unit 22 extracts one or more operating conditions which satisfied desired processing capacity referring to the performance table 26. When the number of the operating conditions extracted is equal to or more than two, the operation control unit 22 refers to the power consumption table 27 and selects the operating condition with low power consumption among the plurality of operating conditions extracted. By operating the CPU 11 with the operating condition selected in this way, it is possible to select a combination of the number of CPU cores and the operating frequency with low power consumption when operating the CPU 11 at a certain processing capacity. Accordingly, it is possible to carry out temperature control, for example, from the viewpoint both of performance and power consumption while exerting a desired performance even under an environment in which power consumption is restricted.

Second Embodiment

Next, a second embodiment is explained. A hardware configuration of a semiconductor device according to the second embodiment is the same as the configuration of the semiconductor device 10 according to the first embodiment shown in FIG. 1. In addition, functional blocks relating to portions to control the operating condition in the semiconductor device 10 according to the present embodiment are the same as the functional blocks according to the first embodiment shown in FIG. 2.

In the present embodiment, a plurality of temperature threshold values are set in multiple stages. Hereinafter, a case where two upper limit temperature threshold values are set as the upper limit temperature threshold value is explained. It is assumed that an upper limit threshold value A of a first stage is lower than an upper limit threshold value B of a second stage. In the present embodiment, two lower limit temperature threshold values maybe set, and descriptions relating to the two upper limit temperature threshold values described below can be similarly applied to the two lower limit temperature threshold values. Note that the number of stages set to temperature threshold values is not limited to two.

In the present embodiment, when a temperature measured by using the temperature sensor 15 is equal to or higher than the upper limit temperature threshold value A and lower than the upper limit temperature threshold value B, similar to the operation in the first embodiment, the operation control unit 22 searches for, in the performance table 26, processing capacity having a predetermined relationship with respect to reference processing capacity. When the temperature measured is equal to or higher than the upper limit temperature threshold value B, the temperature control unit 22 limits a searching range in the performance table 26 to operating conditions, power consumption of which satisfies, in the power consumption table 27, a predetermined relationship with respect to the power consumption before carrying out control of the operating condition. For example, the searching range in the performance table 26 is limited to operating conditions, power consumption of which is equal to or less than a predetermined ratio with respect to reference power consumption, for example, equal to or less than 50% with respect to reference power consumption. The reference power consumption is, for example, power consumption of the operating condition when the temperature control s initiated. The operation control unit 22 searches for operating conditions having a predetermined relationship with respect to the reference processing capacity within the limited searching range. When there are a plurality of operating conditions associated with the processing capacity searched for, the operation control unit 22 selects an operating condition with low power consumption referring to the power consumption table 27.

[Operation Procedure]

Figure 8:
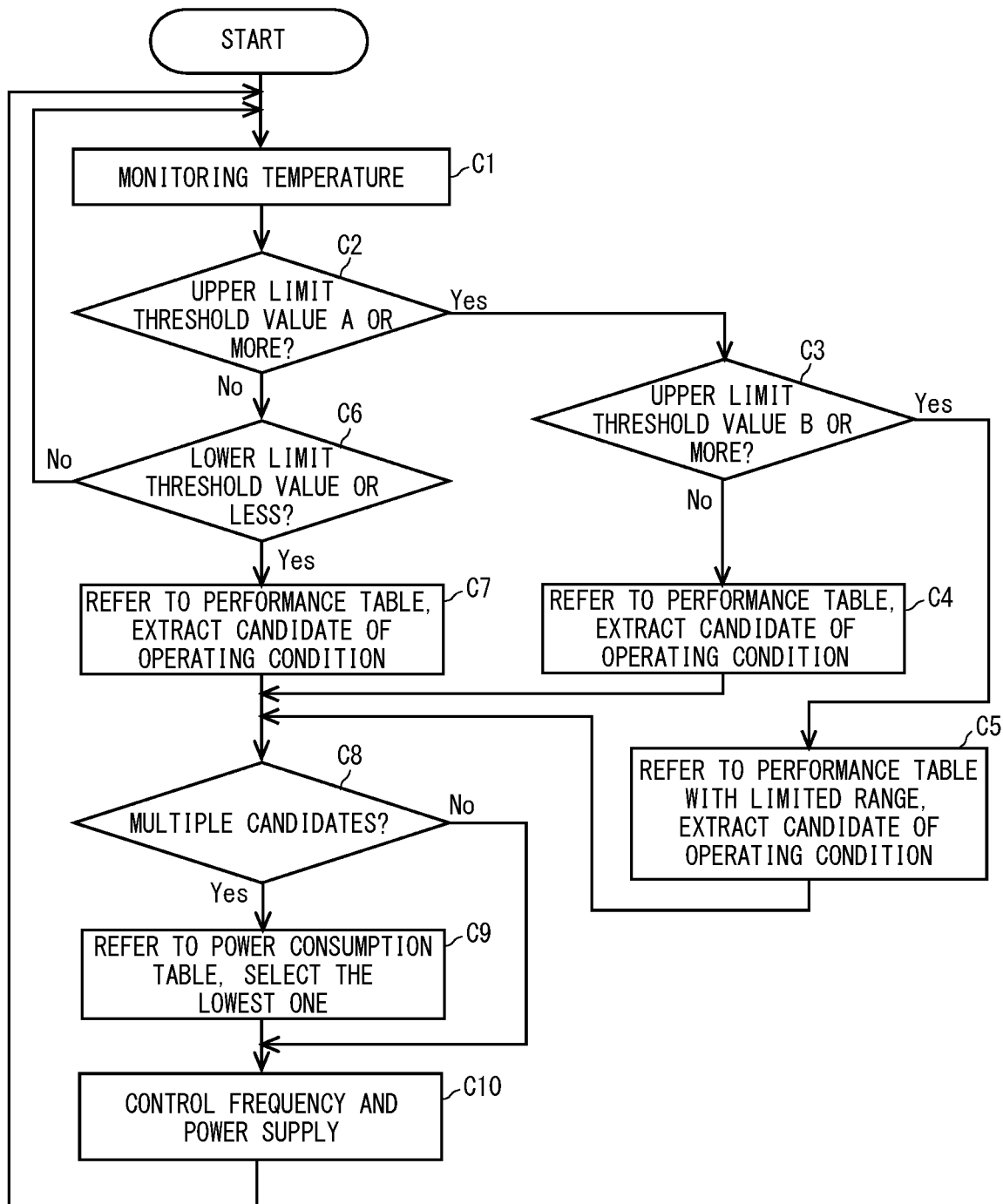
FIG. 8 is a flow chart showing an operation procedure of control of an operating condition in a second embodiment.

FIG. 8 shows an operation procedure of control of the operating condition in the present embodiment. The temperature determination unit 21 obtains a signal output from the temperature sensor 15, and monitors the temperature of the semiconductor device 10 (Step C1). The temperature determination unit 21 determines whether the temperature measured by using the temperature sensor 15 is equal to or higher than the upper limit temperature threshold value A or not (Step C2). When the temperature determination unit 21 determines that the temperature is equal to or higher than the upper limit temperature threshold value A, it then determines whether the temperature is equal to or higher than the upper limit temperature threshold value B or not (Step C3).

When the temperature determination unit 21 determines that the temperature is higher than the upper limit temperature threshold value A at Step C2 and the temperature is lower than the upper limit temperature threshold value B at Step C3, it notifies the operation control unit 22 of that. Upon receiving the notification, the operation control unit 22 searches for the performance table 26 and extracts one or more operating conditions associated with processing capacity one level lower than the processing capacity associated with the current operating condition, as a candidate of the operating condition after the control of the operating condition (Step C4).

When the temperature determination unit 21 determines that the temperature is equal to or higher than the upper limit temperature threshold value B at Step C3, it notifies the operation control unit 22 of that. Upon receiving the notification, the operation control unit 22 refers to the power consumption table 27 and obtains the reference power consumption. The operation control unit 22 extracts, for example, operating conditions associated with power consumption of 50% or less than the reference power consumption from the power consumption table 27. The operation control unit 22 creates a performance table, the searching range of which is limited, by validating portions in the performance table 26 associated with the operating conditions extracted, and invalidating portions associated with operating conditions other than the operating conditions extracted. The operation control unit 22 extracts, from the performance table, in which the searching range is limited, one or more operating conditions associated with processing capacity one level lower than the processing capacity associated with the current operating condition, as a candidate of the operating condition after the control of operating condition (Step C5).

When the temperature determination unit 21 determines that the temperature measured at Step C2 is lower than the upper limit temperature threshold value A, it determines whether the temperature measured is equal to or lower than the lower limit temperature threshold value or not (Step C6). When the temperature determination unit 21 determines that the temperature is higher than the lower limit temperature threshold value, returning to Step C1, it continues the monitoring of the temperature. When the temperature determination unit 21 determines that the temperature is equal to or lower than the lower limit temperature threshold value, it notifies the operation control unit 22 of that. Upon receiving a notification indicating that the temperature is equal to or lower than the lower limit temperature threshold value, the operation control unit 22 searches for the performance table 26 and extracts one or more operating conditions associated with processing capacity one level higher than the processing capacity associated with the current operating condition, as a candidate of the operating condition after the control of the operating condition (Step C7).

The operation control unit 22 determines whether or not a plurality of operating conditions (candidates of the operating condition) are extracted at Step C4, Step C5, or Step C7 (Step C8). When the operation control unit 22 determines that a plurality of operating conditions are extracted, it refers to the power consumption table 27 and obtains power consumption associated with each of the plurality of the operating conditions extracted. The operation control unit 22 compares the respective obtained power consumptions associated with the plurality of the operating conditions with each other, and selects an operating condition with the lowest power consumption (Step C9).

The operation control unit 22 controls the operating condition of the CPU 11 so as to operate the CPU 11 by a combination of the number of the CPU cores and the operating frequency indicated by the operating condition extracted at Step C4, Step C5, or Step C7, or selected at Step C9 (Step C10). In Step C10, the power source control unit 23 supplies electricity to the number of the CPU cores indicated by the operating condition, for example, selected at Step C9 among the CPU cores 11a to 11d. The power source control unit 23 cuts off power supply to the CPU cores which are not operated. Further, the clock control unit 24 supplies a clock signal of the operating frequency indicated by the operating condition, for example, selected at Step C9. Thereafter, the process returns to Step C1, and monitoring of the temperature is continued.

Numerical Example

Hereinafter, specific numerical examples are explained. It is assumed that an SoC (Silicon On. Chip) heat resistant standard is Tj<=125 degrees Celsius. Further it is assumed that the upper limit temperature threshold value A is 90 degrees Celsius and the upper limit temperature threshold value B is 110 degrees Celsius. It is assumed here that, when the temperature measured is equal to or higher than 90 degrees Celsius and lower than 110 degrees Celsius, processing capacity one level lower than the reference processing capacity is searched for using the performance table 26 shown as Table 2 at Step C4 of FIG. 8.

For example, a case is considered where, when the temperature measured is equal to or higher than 110 degrees Celsius, operating conditions associated with power consumption of 50% or less than the reference power consumption will be extracted, at Step C5, as candidates of the operating condition after the control of the operating condition in order to increase the amount of reduction of power consumption. In order to realize such extraction of operating conditions, operating conditions, power consumption or which exceeds 50% of the reference power consumption, may be excluded from the searching range in the performance table 26, when carrying out the extraction of operating conditions at Step C5.

For example, at a certain time, it is assumed that all of the four CPU cores 11a to 11d of the CPU 11 operate at an operating frequency 2000 MHz. Referring to the power consumption table 27 shown as Table 3, power consumption of this operating condition is 4280 mW. Referring to the power consumption table 27 shown as Table 3, power consumption of operating conditions composed of combinations of the number of operating CPU cores 3 and the operating frequencies 1500 MHz and 2000 MHz, and combinations composed of the number of operating CPU cores 4 and the operating frequencies 1000 MHz, 1500 MHz, and 2000 MHz exceeds 50% of the power consumption 4280 mW, namely exceeds 2140 mW. In the power consumption table 27 shown as Table 3, by deleting power consumption exceeding 50% of the power consumption 4280 mW, the following Table 4 can be obtained.

TABLE 4

POWER CONSUMPTION TABLE

| Operating frequency | Number of CPUs | | | |
|---|---|---|---|---|
| | 1 | 2 | 3 | 4 |
| 500 MHz | 380 mW | 760 mW | 1140 mW | 1520 mW |
| 1000 MHz | 610 mW | 1220 mW | 1830 mW | |
| 1500 MHz | 840 mW | 1680 mW | | |
| 2000 MHz | 1070 mW | 2140 mW | | |

In the above described case, in the search of the performance table 26 at Step C5, the power consumptions exceeding 50% are excluded from the searching range. The performance table 26 referred to in the searching of Step C5 in the above described case is shown as the following Table 5. The operation control unit 22 refers, at Step C5, to the performance table shown as Table 5 and searches for operating capacity one level lower than the current processing capacity 48000 DMIPS.

TABLE 5

PERFORMANCE TABLE

| Operating frequency | Number of CPUs | | | |
|---|---|---|---|---|
| | 1 | 2 | 3 | 4 |
| 500 MHz | 3000 DMIPS | 6000 DMIPS | 9000 DMIPS | 12000 DMIPS |
| 1000 MHz | 6000 DMPIS | 12000 DMIPS | 18000 DMPIS | |
| 1500 MHz | 9000 DMIPS | 18000 DMIPS | | |
| 2000 MHz | 12000 DMIPS | 24000 DMIPS | | |

Figure 9:
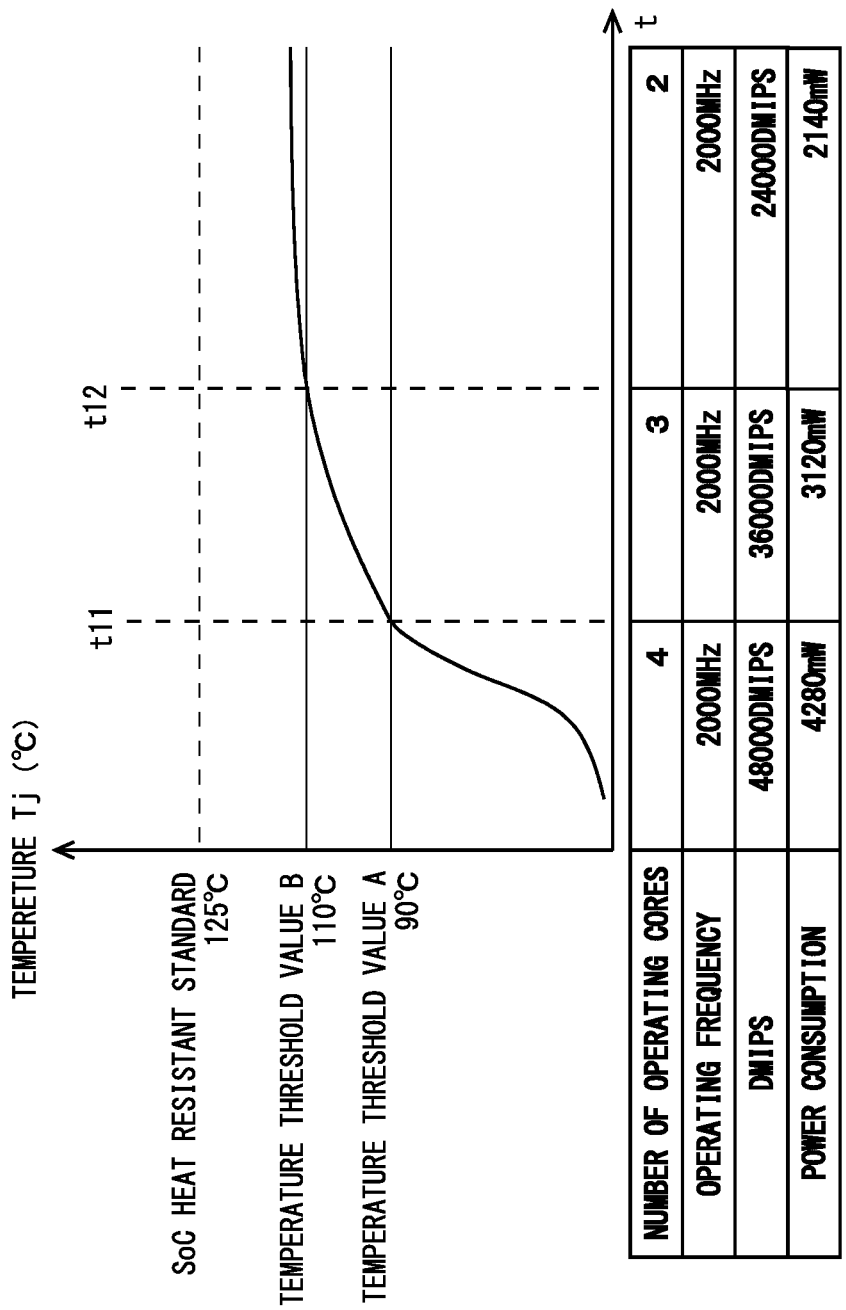
FIG. 9 is a diagram showing change a temperature change of a semiconductor device and control of an operating condition.

FIG. 9 shows a temperature change of the semiconductor device 10 and control of the operating condition. In a graph shown in FIG. 9, the ordinate represents temperature and the abscissa represents time. It is assumed that all of the four CPU cores 11a to 11d of the CPU 11 operate at an operating frequency 2000 MHz in the semiconductor device 10 at first.

It is assumed that the temperature measured by using the temperature sensor 15 becomes equal to or higher than 90 degrees Celsius at time t11. At time t11, the temperature determination unit 21 determines that the temperature is equal to or higher than the upper limit temperature threshold value A (90 degrees Celsius) at Step C2, and determines that the temperature is not equal to or higher than the upper limit temperature threshold value B (110 degrees Celsius) at Step C3. At step C4, the operation control unit 22 searches for the performance table 26 shown as Table 2 and extracts one or more operating conditions associated with processing capacity 36000 DMIPS one level lower than the current processing capacity 48000 DMIPS.

Referring to Table 2, there are two operating conditions associated with the processing capacity 36000 DMIPS: an operating condition composed of a combination of the number of operating CPU cores 4 and the operating frequency 1500 MHz, and an operating condition composed of a combination of the number of operating CPU cores 3 and the operating frequency 2000 MHz. The operation control unit 22 determines at Step C8 that a plurality of candidates of the operating conditions are extracted, and refers to the power consumption table 27 shown as Table 3 and selects an operating condition with low power consumption out of the two operating conditions at Step C9.

Referring to the Table 3, the power consumption associated with the operating condition composed of the combination of the number of operating CPU cores 4 and the operating frequency 1500 MHz is 3360 mW, and the power consumption associated with the operating condition composed of the combination of the number of operating CPU cores 3 and the operating frequency 2000 MHz is 3210 mW. Accordingly, the operating condition composed of the combination of the number of operating CPU cores 3 and the operating frequency 2000 MHz is selected at Step C9. The operation control unit 22 controls the operating condition of the CPU 11 so as to operate three CPU cores in the CPU 11 at the operating frequency 2000 MHz, at Step C10.

Thereafter, it is assumed that the temperature further rises and becomes equal to or higher than 110 degrees Celsius at time t12. AT time t12, the temperature determination unit 21 determines that the temperature is equal to or higher than the upper limit temperature threshold value A (90 degrees Celsius) at Step C2, and determines that the temperature is equal to or higher than the upper limit temperature threshold value B (110 degrees Celsius) at Step C3. At Step C5, the operation control unit 22 searches for the performance table shown as Table 5, the searching range of which is limited, and extracts an operating condition associated with processing capacity 24000 DMIPS one level lower than the current processing capacity 36000 DMTP.

Referring to Table 5, an operating condition composed of a combination of the number of operating CPU cores 2 and the operating frequency 2500 MHz is the only operating condition associated with the processing capacity 24000. The operation control unit 22 determines at Step C8 that a plurality of candidates of the operating conditions are not extracted, and controls the operating condition of the CPU 11 so as to operate two CPU cores in the CPU 11 at the operating frequency 2500 MHz, at Step C10.

Supposing that an operating condition is extracted referring to the performance table 26 shown as Table 2 at Step C5, an operating condition associated with the processing capacity 27000 DMIPS will be extracted. Referring to the power consumption table 27 shown as Table 3, power consumption when operating the CPU 11 with this operating condition is 2520 mW. On the other hand, power consumption when operating the CPU 11 with the operating condition extracted by referring to the performance table shown as Table 5 is 2140 mW. In this way, by limiting the searching range in the performance table 26, it is possible to operate the semiconductor device with lower power consumption when the temperature rises up to the upper limit temperature threshold value 110 degrees Celsius of the second stage. As a result, it is possible to prevent the temperature of the semiconductor device 10 from rising up to 125 degrees Celsius, which is the SoC heat resistant standard

SUMMARY

In the present embodiment, two stages of the upper limit temperature threshold values are set, and the searching range in the performance table 26 is limited to operating conditions, power consumption of which satisfies a predetermined requirement in the power consumption table 27, when the temperature becomes equal to or higher than the upper limit temperature threshold value of the second stage. For example, by limiting the searching range of the performance table 26 to operating conditions associated with power consumption 50% or less of reference power consumption, it is possible to operate the CPU 22 under an operating condition with lower power consumption compared to a case where the searching range is not limited. Consequently, the temperature rise of the semiconductor device 10 can be effectively suppressed.

Third Embodiment

Next, a third embodiment is explained. A hardware configuration of a semiconductor device according to the third embodiment is the same as the configuration of the semiconductor device 10 according to the first embodiment shown in FIG. 1. In addition, functional blocks relating to portions to control the operating condition in the semiconductor device 10 according to the present embodiment are the same as the functional blocks according to the first embodiment shown in FIG. 2.

In the present embodiment, the operation control unit 22 obtains usage of the CPU 11. The operation control unit 22 obtains, for example, a CPU use rate in the CPU 11. In the present embodiment, the operation control unit 22 carries out control of an operating condition of the CPU 11 based on the CPU use rate, in addition to or as an alternative to the temperature control. More specifically, the operation control unit 22 calculates reference processing capacity (required processing capacity) based on the CPU use rate, and controls the operating condition of the CPU 11 based on the required processing capacity.

The operation control unit 22 searches for the performance table 26 and extracts one or more operating conditions associated with the lowest processing capacity from among processing capacities higher than the required processing capacity; in other words, it extracts one or more operating conditions associated with processing capacity one level higher than the required processing capacity. When one operating condition is extracted, the operation control unit 22 controls the operating condition of the CPU 11 to the operating condition extracted. When a plurality of operating conditions are extracted, the operation control unit 22 refers to the power consumption table 27 to identify an operating condition with the lowest power consumption among the plurality of operating conditions, and controls the operating condition of the CPU 11 to the operating condition identified.

[Operation Procedure]

Figure 10:
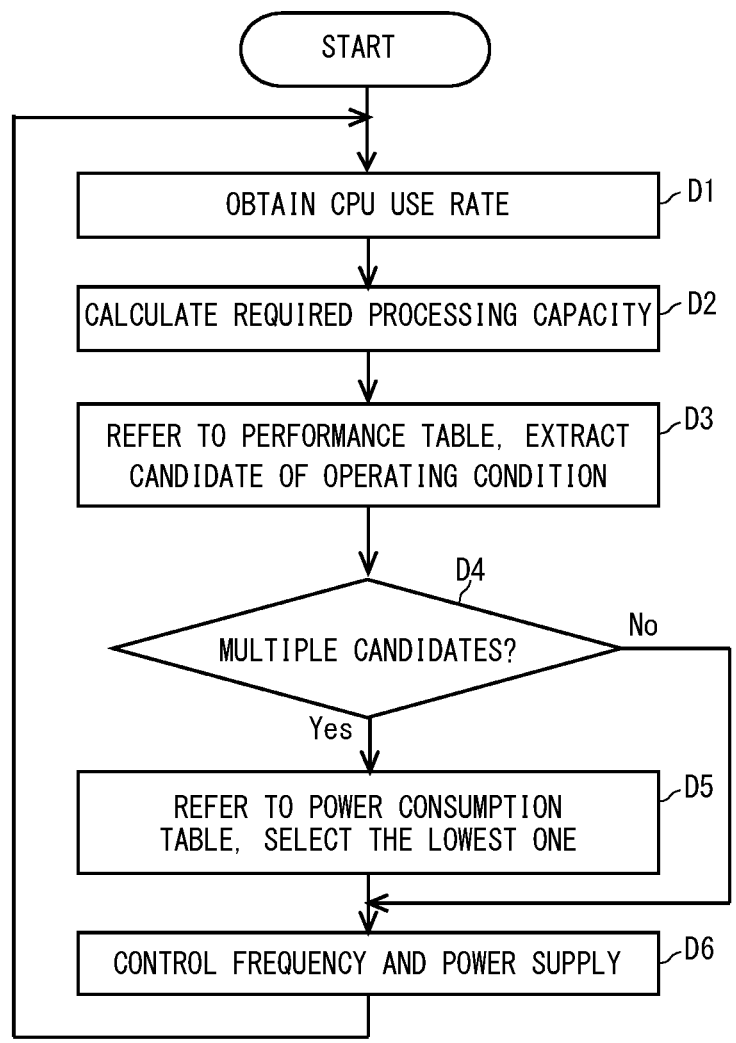
FIG. 10 is a flow chart showing an operation procedure of control of an operating condition in a third embodiment.

FIG. 10 shows an operation procedure of the control of the operating condition. The operation control unit 22 obtains the CPU use rate of the CPU 11 and monitors the usage of the CPU 11 (Step D1). The operation control unit 22 calculates the required processing capacity based on the CPU use rate obtained (Step D2). For example, a case where all of the four CPU cores 11a to 11d operate in the CPU 11 and the operating frequency is 2000 MHz is considered. It is assumed that a performance specification of each CPU core is 6 DMTPS/MHz. In this case, when the CPU use rate obtained is 45%, assuming that a predetermined coefficient is 1.2, the required processing capacity s calculated by using the following equation.

Required processing capacity=6 [DMIPS/ MHz]\*2000 [MHz]\*4 [number]\*45 [%]\*1.2 (coeffcient)=25920 [DMIPS]

Here, in the above equation, the coefficient is set to 1.2 as a margin of 20% generally used in the scheduler and the like.

The operation control unit 22 searches for the performance table 26 and extracts one or more operating conditions associated with one level higher than the required processing capacity, as candidates of the operating condition after the control of the operating condition (Step D3). For example, when the required processing capacity is 25920 DMIPS, the operation control unit 22 extracts, at Step D3, one or more operating conditions associated with processing capacity 27000 DMIPS, which is the lowest processing capacity among processing capacities equal to or higher than 25920 DMIPS in the performance table 26 shown as Table 2. That is to say, the operation control unit 22 extracts, at Step D3, the operating condition in which the number of operating CPUs is 3 and the operating frequency is 1500 MHz.

The operation control unit 22 determines whether a plurality of operating conditions (candidates of the operating condition) are extracted or not (Step D4). When the operation control unit 22 determines that a plurality of operating conditions are extracted, it refers to the power consumption table 27 and obtains power consumption associated with each of the plurality of the operating conditions extracted. The operation control unit 22 compares the respective obtained power consumptions associated with the plurality of the operating conditions with each other, and selects an operating condition with the lowest power consumption (Step D5).

The operation control unit 22 controls the operating condition of the CPU 11 so as to operate the CPU 11 by a combination of the number of the CPU cores and frequency indicated by the operating condition extracted at Step D3, or selected at Step D5 (Step D6). In the above described case, the operation control unit 22 operates three CPU cores in the CPU 11 and supplies a clock signal of 1.500 MHz to each CPU core. Thereafter, the process returns to Step D1, and monitoring of the CPU usage is continued.

SUMMARY

In the present embodiment, the operation control unit 22 calculates the required processing capacity based on the CPU use rate and controls the CPU 11 to the operating condition which satisfies the required processing capacity. By doing so, it is possible to operate the CPU 11 with an operating condition according to a required processing capacity in the present embodiment, when there are a plurality of operating conditions which realize the same processing capacity, an operating condition with the lowest power consumption is selected. In this way, even in a normal state, it is possible to operate the CPU 11 with a low power consumption while maintaining performance.

Modified Example

It should be noted that an example in which the reference power consumption is the power consumption of the operating condition when the temperature control is initiated is explained in the second embodiment. However, present disclosure is not limited thereto. For example, power consumption 3120 mW of an operating condition when the temperature becomes equal to or more than 110 degrees Celsius at time t12 of FIG. 9 may be the reference power consumption, and the searching range of the performance table 26 may be limited such that one or more operating conditions associated with 50% or less of the reference power consumption is extracted.

While the invention has been described in terms of several embodiments, those skilled in the art will recognize that the invention can be practiced with various modifications within the spirit and scope of the appended claims and the invention is not limited to the examples described above.

The above described embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

For example, all or some of the embodiments disclosed above can be described like in, but not limited to, the following supplementary notes.

[Supplementary Note 1]

A semiconductor device comprising:

a process execution unit configured such that an operating condition thereof can be varied;

an operation control unit configured to control the operating condition of the process execution unit referring to a performance table representing a relationship between the operating condition and processing capacity of the process execution unit and a power consumption table representing a relationship between the operating condition and power consumption.

[Supplementary Note 2]

The semiconductor device according to Supplementary note 1, wherein:

the process execution unit comprises a plurality of processors configured such that an operating frequency can be varied; and the operating condition includes a combination of a number of processors to operate in the process execution unit and an operating frequency of the processor.

[Supplementary Note 3]

The semiconductor device according to Supplementary note 2, wherein, the operation control unit determines a number of the processors to operate in the process execution unit and an operating frequency of each of the processors referring to the performance table and the power consumption table.

[Supplementary Note 4]

The semiconductor device according to Supplementary note 3, wherein, the operation control unit comprises a power source control unit configured to supply electricity to a processor determined to operate, and a clock control unit configured to supply a clock signal of an operating frequency determined to the processor.

[Supplementary Note 5]

The semiconductor device according to Supplementary note 1, wherein:

the operation control unit extracts one or more operating conditions associated with a processing capacity having a predetermined relationship with respect to a reference processing capacity referring to the performance table, when a plurality of operating conditions are extracted, the operation control unit identifies an operating condition with the lowest power consumption among the plurality of operating conditions, and controls the operating condition of the process execution unit to the operating condition identified.

[Supplementary Note 6]

The semiconductor device according to Supplementary note 1 further comprising a temperature sensor configured to measure a temperature; and wherein, the operation control unit carries out control of the operating condition of the process execution unit based on a temperature measured by using the temperature sensor.

[Supplementary Note 7]

The semiconductor device according to Supplementary note 6, wherein, when the temperature measured is equal to or higher than an upper limit temperature threshold value, the operation control unit lowers power consumption by controlling the operating condition.

[Supplementary Note 8]

The semiconductor device according to Supplementary note 6, wherein:

when the temperature measured is equal to or higher than an upper limit temperature threshold value, the operation control unit searches for the performance table to extract one or more operating conditions associated with the highest processing capacity among processing capacities lower than a reference processing capacity, when one operating condition is extracted, the operation control unit controls the operating condition of the process execution unit to the operating condition extracted, and when a plurality of operating conditions are extracted, the operation control unit refers to the power consumption table, identifies an operating condition with the lowest power consumption among the plurality of operating conditions extracted, and controls the operating condition or the process execution unit to the operating condition identified.

[Supplementary Note 9]

The semiconductor device according to Supplementary note 6, wherein:

when the temperature measured is equal to or higher than a first upper limit temperature threshold value and lower than a second upper temperature threshold value which is higher than the first upper limit temperature threshold value, the operation control unit searches for the performance table to extract one or more operating conditions associated with the highest processing capacity among processing capacities lower than a reference processing capacity, when the temperature measured is equal to or higher than the second upper limit temperature threshold value, the operation control limits a searching range in the performance table to operating conditions, power consumption of which satisfies a predetermined relationship with respect to reference power consumption in the power consumption table, and searches for the performance table to extract one or more operating conditions associated with the highest processing capacity among processing capacities lower than the reference processing capacity, when one operating condition is extracted, the operation control unit controls the operating condition of the process execution unit to the operating condition extracted, and when a plurality of operating conditions are extracted, the operation control unit refers to the power consumption table, identifies an operating condition with the lowest power consumption among the plurality of operating conditions extracted, and controls the operating condition or the process execution unit to the operating condition identified.

[Supplementary Note 10]

The semiconductor device according to Supplementary note 8, wherein the reference processing capacity is a processing capacity of the process execution unit before the operating condition is controlled.

[Supplementary Note 11]

The semiconductor device according to Supplementary note 6, wherein, when the temperature measured is equal to or higher than a lower limit temperature threshold value, the operation control unit increases power consumption by controlling the operating condition.

[Supplementary Note 12]

The semiconductor device according to Supplementary note 11, wherein:

when the temperature measured is equal to or lower than the lower limit temperature threshold value, the operation control unit searches for the performance table to extract one or more operating conditions associated with the lowest processing capacity among processing capacities higher than a reference processing capacity, when one operating condition is extracted, the operation control unit controls the operating condition of the process execution unit to the operating condition extracted, and when a plurality of operating conditions are extracted, the operation control unit refers to the power consumption table, identifies an operating condition with the lowest power consumption among the plurality of operating conditions extracted, and controls the operating condition of the process execution unit to the operating condition identified.

[Supplementary Note 13]

The semiconductor device according to Supplementary note 2, wherein the operation control unit carries out control of the operating condition of the process execution unit based on a use rate of the processor in the process execution unit.

[Supplementary Note 14]

The semiconductor device according to Supplementary note 13, wherein the operation control unit, calculates a reference processing capacity based on the use rate, and carries out control of the operating condition of the process execution unit based on the reference processing capacity calculated.

[Supplementary Note 15]

The semiconductor device according to Supplementary note 14, wherein:

the operation control unit searches for the performance table to extract one or more operating conditions associated with the lowest processing capacity among processing capacities higher than a reference processing capacity, when one operating condition is extracted, the operation control unit controls the operating condition of the process execution unit to the operating condition extracted, and when a plurality of operating conditions are extracted, the operation control unit refers to the power consumption table, identifies an operating condition with the lowest power consumption among the plurality of operating conditions extracted, and controls the operating condition of the process execution unit to the operating condition identified.

[Supplementary Note 16]

The semiconductor device according to Supplementary note 6, further comprising:

a table creation unit configured to calculate power consumption for each of the operating conditions under an environment, of a temperature measured by using the temperature sensor, based on the temperature measured and data used for calculating power consumption, associate the power consumption calculated with each of the operating conditions, and store the power consumption calculated in the power consumption table.

[Supplementary Note 17]

A micro computer unit comprising:

a process execution unit comprising a plurality of processors configured such that an operating frequency can be varied, the process execution unit being configured such that an operating condition including a combination of a number of processors to operate and an operating frequency of the processor can be varied;

an operation control unit configured to control the number of processors to operate in the process execution unit and the operating frequency of the processor referring to a performance table representing a relationship between the operating condition and a processing capacity of the process execution unit and a power consumption table representing a relationship between the operating condition and power consumption.

[Supplementary Note 18]

A microcomputer unit comprising:

a plurality of processors configured such that an operating frequency can be varied; and a memory, and wherein the processor operates according to a program read out from the memory, and executes operations comprising:

referring to a performance table representing a relationship between an operating condition of the processor and a processing capacity of the process execution unit, and extracting one or more operating conditions associated with a processing capacity having a predetermined relationship with respect to a reference processing capacity when one operating condition is extracted, controlling the operating condition of the process execution unit to the operating condition extracted, and when a plurality of operating conditions are extracted, referring to a power consumption table representing a relationship between the operating condition and power consumption and identifying an operating condition with the lowest power consumption among the plurality of operating conditions, and controlling the operating condition of the process execution unit to the operating condition identified.

[Supplementary Note 19]

The operating condition controlling method comprising:

referring to a performance table representing a relationship between an operating condition of a process execution unit configured such that the operating condition can be varied and a processing capacity of the process execution unit, and extracting one or more operating conditions associated with a processing capacity having a predetermined relationship with respect to a reference processing capacity when one operating condition is extracted, controlling the operating condition of the process execution unit to the operating condition extracted, and when a plurality of operating conditions are extracted, referring to a power consumption table representing a relationship between the operating condition and power consumption and identifying an operating condition with the lowest power consumption among the plurality of operating conditions, and controlling the operating condition of the process execution unit to the operating condition identified.

[Supplementary Note 20]

A Non-transitory Computer Readable medium storing a program causing a computer to execute operating condition controlling, wherein the operating condition controlling comprises:

referring to a performance table representing a relationship between an operating condition of a process execution unit configured such that the operating condition can be varied and processing capacity of the process execution unit, and extracting one or more operating conditions associated with a processing capacity having a predetermined relationship with respect to a reference processing capacity when one operating condition is extracted, controlling the operating condition of the process execution unit to the operating condition extracted, and when a plurality of operating conditions are extracted, referring to a power consumption table representing a relationship between the operating condition and power consumption and identifying an operating condition with the lowest power consumption among the plurality of operating conditions, and controlling the operating condition of the process execution unit to the operating condition identified.

What is claimed is:

1. A semiconductor device comprising:
a process execution unit configured such that an operating condition thereof can be varied; and
an operation control unit configured to change the operating condition of the process execution unit referring to a performance table representing a relationship between the operating condition and processing capacity of the process execution unit and a power consumption table representing a relationship between the operating condition and power consumption,
wherein the power consumption related to the operating condition in the power consumption table includes a leak power depending on a temperature,
wherein the process execution unit comprises a plurality of processors configured such that an operating frequency can be varied,
wherein the operating condition includes a combination of a number of processors to operate in the process execution unit and an operating frequency of the processors, and
wherein the operation control unit determines a number of the processors to operate in the process execution unit and an operating frequency of each of the processors based on referring to the performance table and the power consumption table.

2. The semiconductor device according to claim 1, wherein,
the operation control unit comprises a power source control unit configured to supply electricity to a processor determined to operate, and a clock control unit configured to supply a clock signal of an operating frequency determined to the processor.

3. The semiconductor device according to claim 1, wherein,
the operation control unit extracts one or more operating conditions associated with a processing capacity having a predetermined relationship with respect to a reference processing capacity referring to the performance table,
when a plurality of operating conditions are extracted, the operation control unit identifies an operating condition with the lowest power consumption among the plurality of operating conditions, and changes the operating condition of the process execution unit to the operating condition identified.

4. The semiconductor device according to claim 1 further comprising:
a temperature sensor configured to measure a temperature; and wherein:
the operation control unit carries out control of the operating condition of the process execution unit based on a temperature measured by using the temperature sensor.

5. The semiconductor device according to claim 4, wherein,
when the temperature measured is equal to or higher than an upper limit temperature threshold value, the operation control unit lowers power consumption by changes the operating condition.

6. The semiconductor device according to claim 4, wherein:
when the temperature measured is equal to or higher than an upper limit temperature threshold value, the operation control unit searches for the performance table to extract one or more operating conditions associated with the highest processing capacity among processing capacities lower than a reference processing capacity,
when one operating condition is extracted, the operation control unit controls changes the operating condition of the process execution unit to the operating condition extracted, and
when a plurality of operating conditions are extracted, the operation control unit refers to the power consumption table, identifies an operating condition with the lowest power consumption among the plurality of operating conditions extracted, and changes the operating condition of the process execution unit to the operating condition identified.

7. The semiconductor device according to claim 6, wherein
the reference processing capacity is a processing capacity of the process execution unit before the operating condition is controlled.

8. The semiconductor device according to claim 4, wherein:
when the temperature measured is equal to or higher than a first upper limit temperature threshold value and lower than a second upper temperature threshold value which is higher than the first upper limit temperature threshold value, the operation control unit searches for the performance table to extract one or more operating conditions associated with the highest processing capacity among processing capacities lower than a reference processing capacity,
when the temperature measured is equal to or higher than the second upper temperature threshold value, the operation control unit limits a searching range in the performance table to operating conditions, power consumption of which satisfies a predetermined relationship with respect to reference power consumption in the power consumption table, and searches for the performance table to extract one or more operating conditions associated with the highest processing capacity among processing capacities lower than the reference processing capacity,
when one operating condition is extracted, the operation control unit changes the operating condition of the process execution unit to the operating condition extracted, and
when a plurality of operating conditions are extracted, the operation control unit refers to the power consumption table, identifies an operating condition with the lowest power consumption among the plurality of operating conditions extracted, and changes the operating condition of the process execution unit to the operating condition identified.

9. The semiconductor device according to claim 4, wherein, when the temperature measured is equal to or lower than a lower limit temperature threshold value, the operation control unit increases power consumption by changes the operating condition.

10. The semiconductor device according to claim 9, wherein:
when the temperature measured is equal to or lower than the lower limit temperature threshold value, the operation control unit searches for the performance table to extract one or more operating conditions associated with the lowest processing capacity among processing capacities higher than a reference processing capacity, when one operating condition is extracted, the operation control unit changes the operating condition of the process execution unit to the operating condition extracted, and when a plurality of operating conditions are extracted, the operation control unit refers to the power consumption table, identifies an operating condition with the lowest power consumption among the plurality of operating conditions extracted, and changes the operating condition of the process execution unit to the operating condition identified.

11. The semiconductor device according to claim 4, further comprising:
a table creation unit configured to calculate power consumption for each of the operating conditions under an environment of a temperature measured by using the temperature sensor, based on the temperature measured and data used for calculating power consumption, associate the power consumption calculated with each of the operating conditions, and store the power consumption calculated in the power consumption table.

12. The semiconductor device according to claim 11, wherein when a temperature change measured by using the temperature sensor is equal to or greater than a threshold value, the power consumption table is updated by the table creation unit.

13. The semiconductor device according to claim 12, wherein when the power consumption table is updated, the leak power is calculated for each of the operating conditions under an environment of the temperature measured.

14. The semiconductor device according to claim 1, wherein the operation control unit carries out control of the operating condition of the process execution unit based on a use rate of the processor in the process execution unit.

15. The semiconductor device according to claim 14, wherein the operation control unit calculates reference processing capacity based on the use rate, and carries out control of the operating condition of the process execution unit based on the reference processing capacity calculated.

16. The semiconductor device according to claim 14, wherein:
the operation control unit searches for the performance table to extract one or more operating conditions associated with the lowest processing capacity among processing capacities higher than a reference processing capacity,
when one operating condition is extracted, the operation control unit changes the operating condition of the process execution unit to the operating condition extracted, and
when a plurality of operating conditions are extracted, the operation control unit refers to the power consumption table, identifies an operating condition with the lowest power consumption among the plurality of operating conditions extracted, and changes the operating condition of the process execution unit to the operating condition identified.

17. The semiconductor device according to one of claim 1, wherein the power consumption related to the operation condition in the power consumption table includes a dynamic power not depending on a temperature and is represented by a sum of the leak power and the dynamic power.

18. An operating condition controlling method comprising:
referring to a performance table representing a relationship between an operating condition of a process execution unit configured such that the operating condition can be varied and a processing capacity of the process execution unit, and extracting one or more operating conditions associated with a processing capacity having a predetermined relationship with respect to a reference processing capacity;
when one operating condition is extracted, changing the operating condition of the process execution unit to the operating condition extracted; and
when a plurality of operating conditions are extracted, referring to a power consumption table representing a relationship between the operating condition and power consumption and identifying an operating condition with the lowest power consumption among the plurality of operating conditions, and changing the operating condition of the process execution unit to the operating condition identified,
wherein the power consumption related to the operating condition in the power consumption table includes a leak power depending on a temperature,
wherein the process execution unit comprises a plurality of processors configured such that an operating frequency can be varied,
wherein the operating condition includes a combination of a number of processors to operate in the process execution unit and an operating frequency of the processors, and
wherein a number of the processors to operate in the process execution unit and an operating frequency of each of the processors is determined based on referring to the performance table and the power consumption table.

19. A Non-transitory Computer Readable medium storing a program causing a computer to execute operating condition controlling, wherein the operating condition controlling comprises:
referring to a performance table representing a relationship between an operating condition of a process execution unit configured such that the operating condition can be varied and processing capacity of the process execution unit, and extracting one or more operating conditions associated with a processing capacity having a predetermined relationship with respect to a reference processing capacity;
when one operating condition is extracted, changing the operating condition of the process execution unit-to the operating condition extracted; and
when a plurality of operating conditions are extracted, referring to a power consumption table representing a relationship between the operating condition and power consumption and identifying an operating condition with the lowest power consumption among the plurality of operating conditions, and changing the operating condition of the process execution unit to the operating condition identified,
wherein the power consumption related to the operating condition in the power consumption table includes a leak power depending on a temperature,
wherein the process execution unit comprises a plurality of processors configured such that an operating frequency can be varied,
wherein the operating condition includes a combination of a number of processors to operate in the process execution unit and an operating frequency of the processors, and
wherein a number of the processors to operate in the process execution unit and an operating frequency of each of the processors is determined based on referring to the performance table and the power consumption table.

\* \* \* \* \*